Figure 1:
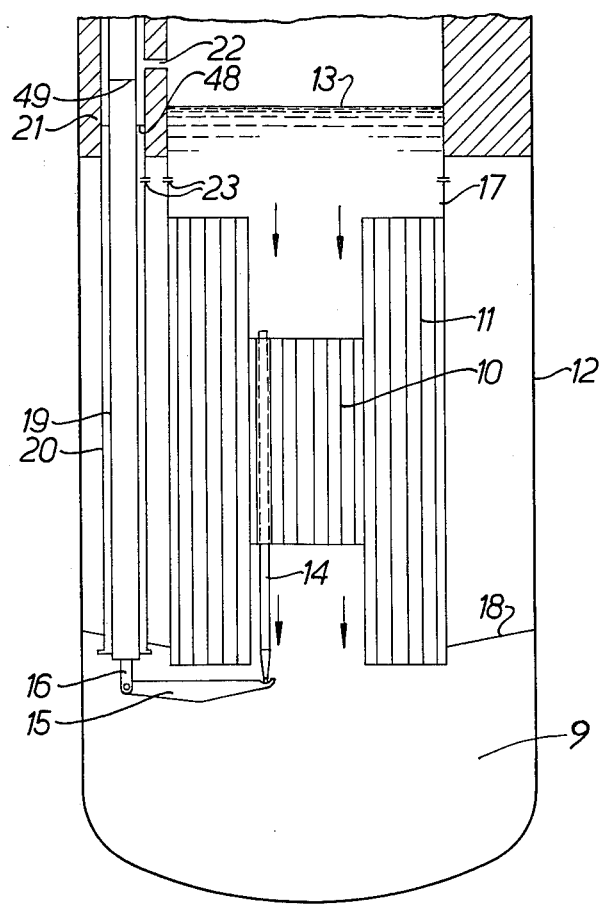

Nov. 23, 1965   J. WEBB ETAL   3,219,539
NUCLEAR REACTORS
Filed June 22, 1962   2 Sheets-Sheet 2
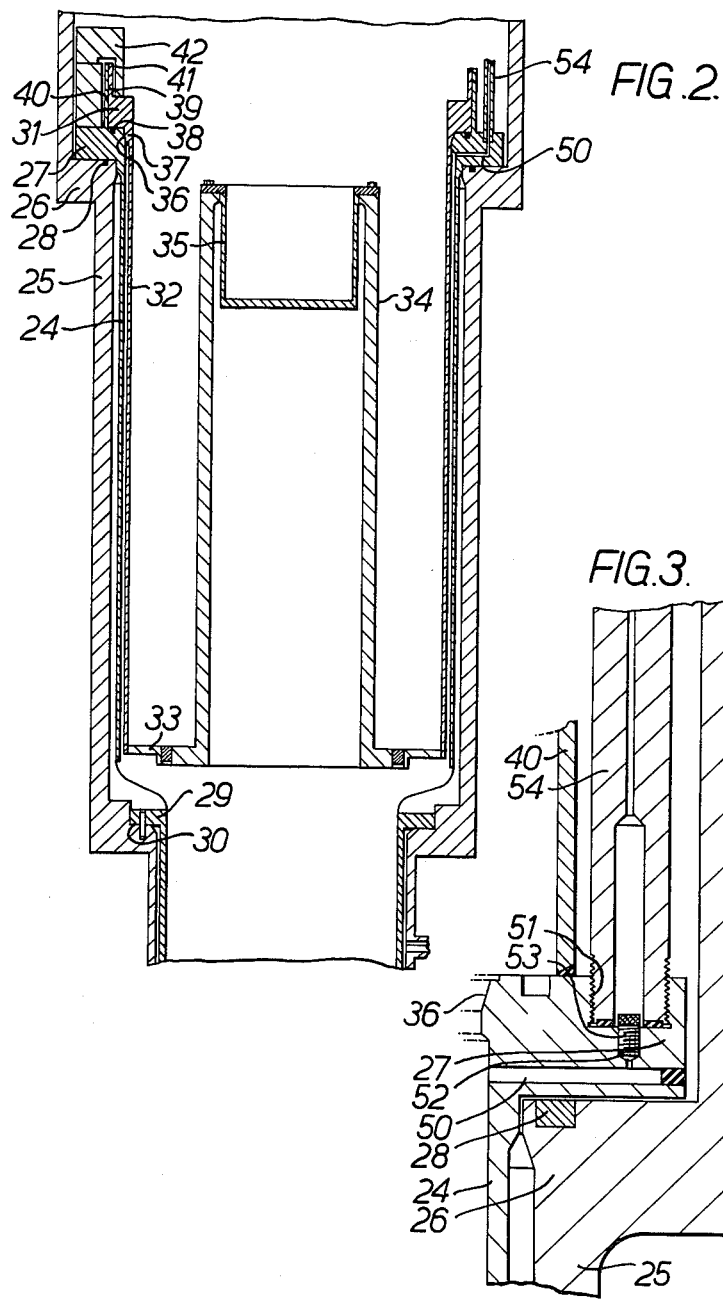

United States Patent Office 3,219,539
Patented Nov. 23, 1965

3,219,539
NUCLEAR REACTORS
John Webb, Bryn, near Wigan, and Harold Friar, St.
Helens, England, assignors to United Kingdom Atomic
Energy Authority, London, England
Filed June 22, 1962, Ser. No. 204,362
Claims priority, application Great Britain, July 3, 1961,
23,901/61
2 Claims. (Cl. 176—40)

The present invention relates to nuclear reactors, and more particularly to nuclear reactors wherein fission of nuclear fuel takes place in a core submerged in a mass of liquid coolant having a free surface (hereinafter referred to as nuclear reactors of the kind described).

In a nuclear reactor of this kind having downward circulation of coolant through the core to a low pressure plenum below the core, it is often necessary to provide casings for members extending into the low pressure plenum from above the coolant surface. However, it has been found that, in pumping the coolant through the core in order to abstract the heat generated by fission therein, considerable pressure differences are set up in the coolant surrounding the core. Thus there is a risk of these pressure differences causing such a depression of the coolant level within casings extending into the coolant from above its free surface that the coolant and the gas above its free surface become intermixed.

As applied to the prevention of such intermixing, the present invention provides, in a downward flow nuclear reactor of the kind described, an elongated casing extending into the coolant mass from above its free surface, which casing is sealed in a gas-tight manner at its upper end. The upper end of the casing, therefore, contains a trapped volume of gas, preferably of the same gas as that present above the remaining free surface of the coolant. Preferably the elongated casing houses a control mechanism which is operated from above the free surface of the coolant and which actuates control elements in the reactor core from below the core.

One construction of nuclear reactor embodying the invention will now be described, by way of example, with reference to the accompanying drawings in which:

FIGURE 1 shows a diagrammatic section through a nuclear reactor having elongated casings according to the invention, FIGURE 2 shows a sectional view of the upper end of one of the elongated casings of FIGURE 1, and FIGURE 3 shows a sectional view of a detail of the upper end of one of the elongated casings of FIGURE 1.

In the fast nuclear reactor now to be described fast neutrons induce fission in a core 10 which is surrrounded by a breeder blanket 11 in a pressure chamber 12. The core is submerged in a liquid metal coolant mass which has a free surface 13 and which is pumped downwardly through the core to extract the heat generated therein; inlets and outlets for the coolant are not shown. The coolant may be a sodium or a sodium/potassium alloy and has a blanket of an inert gas such as nitrogen gas above its free surface. The reactor is controlled by twelve control elements (of which one 14 is shown) insertable into the core which are supported by arms 15 attached to control mechanisms (of which the foot 16 of one is shown). The control mechanisms extend upwardly above the free surface of the coolant. In the fast reactor now described the control elements are constituted by fuel so that the core ractivity is reduced by their downward withdrawal.

The reactor core is mounted within the pressure vessel by means of a concentric shell 17. Webs 18 seal the annular blanket of coolant surrounding the concentric shell. The shell defines a cylindrical flow path for the liquid coolant which is introduced above the core at high pressure and forced downwardly through the core into a low pressure plenum 9. The core presents considerable resistance to the flow of coolant so that the pressure of the coolant drops in its passage through the core. During normal operation of the reactor the pressure of the coolant above the core is 50 p.s.i. and that in the low pressure plenum 9 below the core is only 40 p.s.i.; the nitrogen gas above the coolant is likewise maintained at a pressure of 50 p.s.i.

Each control mechanism is enclosed in an elongated casing or bearing tube 19 which is itself encased in a vessel tube 20. Both the bearing tube and the vessel tube are held at their upper ends by an annulus 21 the lower surface of which is lower than the free surface of the coolant above the core thereby isolating the coolant in the annular space around the concentric shell 17 from the nitrogen gas blanket. The lower ends of both the bearing tube and the vessel tube are open so that the tubes are filled with coolant. The upper end of each vessel tube is in communication with the nitrogen gas blanket through a passage 22 so that a free surface 48 exists between the coolant and the nitrogen in the vessel tube. Owing to the low pressure of the coolant at the lower end of each vessel tube, the nitrogen gas at a constant higher pressure tends to blow through the tube into the coolant below the core. Such intermixing of nitrogen with the coolant cannot be tolerated, however, since nitrogen bubbles entrained in the coolant drawn out of the pressure chamber affect the performance of the reactor, due to their greater neutron moderating effect, and of the coolant pumps adversely; furthermore the nitrogen mixed into the coolant degrades the heat transfer property of the coolant. Accordingly apertures 23 are made in the concentric shell and the vessel tubes so that coolant is drawn into the tubes below the nitrogen blanket and discharged at the lower ends of the tubes.

The bearing tubes 19 are similarly filled with coolant and in these tubes the coolant has a free surface 49 covered by nitrogen gas. However, were the nitrogen in the bearing tubes to be in communication with the nitrogen blanket within the concentric shell and were apertures made in the upper ends of the bearing tubes to admit coolant below the nitrogen blanket as in the vessel tubes, the flow of coolant through the bearing tubes to prevent undue depression of its free surface would be intolerably large, bearing in mind that the coolant flowing through the tubes by-passes the core. Whereas the flow of coolant through the vessel tubes is small and can be throttled by reducing the clearance between the vessel tubes and the bearing tubes, the larger bulk of coolant in the bearing tubes requires a larger flow. A reduction of the flow of coolant through the bearing tubes by reducing the clearance between the tubes and the control mechanisms they encase is unacceptable for the reason that, in an emergency shut-down of the reactor, the control mechanisms are allowed to fall under the action of gravity carrying the control elements out of the reactor core with them; no hindrance to the free fall of the control mechanisms can be permitted.

Accordingly the coolant in each bearing tube is isolated from the coolant in the vessel tubes and the upper ends of the bearing tubes 19 are sealed in a gas-tight manner trapping nitrogen in the tubes above the coolant. At their upper ends the bearing tubes 19 and the vessel tubes 20 are formed with extensions 24 and 25 respectively of larger diameter (FIGURE 2). At the upper end of the extension 25 of each vessel tube, a shoulder 26 formed by a further enlargement of the diameter of the extension supports a flange 27 formed at the upper end of the extension 24 of the bearing tube. A sealing ring 28 inset in the shoulder 26 completes the seal between the vessel tube and the bearing tube. The load of each bearing tube is carried by a flange 29 resting on an internal shoulder 30 formed at the lower end of the extension 25 of each vessel tube. The extension 24 of each bearing tube is closed by a support body in the form of an inverted top hat having a rim 31, a cylindrical body 32 depending from the rim and a crown 33. The crown is formed with a re-entrant core 34 closed at its upper end by a re-entrant boss 35 bolted and welded thereto. Thus the boss 35, the core 34 and the cylindrical body 32 constitute concentric shells within the extensions 24 and 25 of the bearing and vessel tubes. The driven part of an electromagnetic coupling (not shown) which is mounted at the upper end of the control mechanism within a bearing tube is received into the hollow core 34; the driving part of the electromagnetic coupling is mounted within the boss 35 above the driven part. Beneath the electromagnetic coupling, an electromagnet is housed in the annular space between the core and the inner surface of the cylindrical body 32. The electromagnet holds up the control mechanism in its bearing tube during normal operation of the reactor. In the event of an emergency shut down of the reactor the electromagnet releases the control mechanism which drops in the bearing tube under the action of gravity.

As stated above, the seal at the upper end of the bearing tube is gas-tight; this seal is formed between the rim 31 of the top hat and the flange 27 at the upper end of the extension 24 of the bearing tube. The flange 27 is formed with a conical seat 36 to receive a tapering plug portion 37 formed between the rim 31 of the top hat and its cylindrical body; a conical copper joint ring is inserted between the conical seat 36 and the plug portion 37. A silicone rubber sealing ring 38 inset in the flange 27 and surrounding the conical seat 36 bears against the under surface of the rim 31. The peripheral surface of the rim 31 and an upward extension 39 of the rim mate with an annular wall 40 extending upwardly of the flange 27. A welded joint 41 is made at the upper edges of the wall 40 and the extension 39; the joint must be broken when the top hat assembly is removed for maintenance. A clamp 42 encloses the welded joint 41, the wall 40 and the extension 39.

Means are provided to vent the sealed space above the coolant in each bearing tube so that the pressure of nitrogen within the space may be adjusted. A radial passage 50 (FIGURE 3) opens into the space within the upper end of the extension 24 of each bearing tube, just below the conical seat 36. A socket 51 in the upper surface of the shoulder 27 communicates with the radial passage 50 by means of a short bore 52. A threaded plug 53 normally seals the bore 52. The socket 51 is adapted to receive one end of a pipe 54 leading to means whereby the pressure of nitrogen within the bearing tube and its extension can be varied.

Before operation of the reactor the pressure of nitrogen in each bearing tube is adjusted so that the level of coolant within the tubes is above the level of coolant in the vessel tubes and of the coolant above the reactor core within the concentric shell. During operation of the reactor, owing to the pressure differentials set up in the coolant as it is pumped through the core, the levels of the coolant in both the bearing tubes and the vessel tubes fall. The level 48 of coolant in each vessel tube is maintained by flow of coolant through the apertures 23 as described. As the level of coolant in each bearing tube falls, the pressure of nitrogen above the coolant also falls so that an equilibrium level 49 of the coolant is reached. The equilibrium level depends upon the differential pressures set up in the coolant and upon the initial pressure of nitrogen within the bearing tube. The initial pressure of nitrogen is adjusted so that during operation of the reactor the level of the coolant within the bearing tubes can never fall so low that nitrogen is forced through the tube and into the coolant below the core. If possible the level of the coolant within each bearing tube is maintained high enough to ensure immersion in coolant of parts of the control mechanism, such as a screw and nut arrangement, which rely on lubrication by the coolant.

What we claim is:

1. A nuclear reactor comprising a core in which nuclear fission takes place, a liquid coolant mass in which the core is submerged, a low pressure plenum below the core to receive coolant circulated downwardly through the core, a blanket gas above the coolant, a free surface between the coolant and the blanket gas, reactor control mechanism extending into the low pressure plenum from above the free surface and operable to actuate a control element in the reactor core, an elongate casing housing the control mechanism and extending into the coolant mass from above its free surface, said casing opening at its lower end into the low pressure plenum, a gas-tight seal at the upper end of the casing to trap gas by means of which the coolant level within the casing is adjustable, and means in the upper end of the casing to control a pressure differential between gas trapped within the casing and the blanket gas.

2. A nuclear reactor comprising a core in which nuclear fission takes place, a liquid coolant mass in which the core is submerged, a blanket gas above the coolant, a free surface between the coolant and the blanket gas, reactor control mechanism extending into the coolant from above its free surface, a tubular casing housing the control mechanism, said mechanism being sealed at its upper end and in open communication with the coolant at its lower end, and a pressure control device in the upper end of the casing whereby to vary the pressure of gas trapped in the casing thereby to control the level of coolant within the casing.

References Cited by the Examiner

UNITED STATES PATENTS 3,054,741  9/1962  Tatlock et al. _____ 176—30

OTHER REFERENCES

German Patent 1,065,101, Sept. 10, 1959.

CARL D. QUARFORTH, *Primary Examiner.*

REUBEN EPSTEIN, *Examiner.*